(12) United States Patent
Sabacky et al.

(10) Patent No.: US 7,482,304 B2
(45) Date of Patent: Jan. 27, 2009

(54) METHOD FOR PRODUCING STRUCTURES

(75) Inventors: Bruce James Sabacky, Reno, NV (US); Timothy Malcome Spitler, Fernley, NV (US)

(73) Assignee: Altair Nanomaterials Inc., Reno, NV (US)

( * ) Notice: Subject to any disclaimer, the term of this patent is extended or adjusted under 35 U.S.C. 154(b) by 794 days.

(21) Appl. No.: 10/732,864

(22) Filed: Dec. 10, 2003

(65) Prior Publication Data

US 2005/0129923 A1    Jun. 16, 2005

(51) Int. Cl.
*B01J 21/04* (2006.01)

(52) U.S. Cl. ........................ 502/439; 502/351

(58) Field of Classification Search ........... 502/439, 502/350, 349, 312, 311, 305, 309, 324, 351
See application file for complete search history.

(56) References Cited

U.S. PATENT DOCUMENTS

| | | | |
|---|---|---|---|
| 4,012,338 A | 3/1977 | Urwin | |
| 4,065,544 A | 12/1977 | Hamling et al. | |
| 4,482,642 A | 11/1984 | Ettlinger et al. | |
| 4,842,832 A | 6/1989 | Inoue et al. | |
| 4,923,682 A | 5/1990 | Roberts et al. | |
| 4,944,936 A | 7/1990 | Lawhorne | |
| 5,036,037 A | 7/1991 | Kladnig et al. | |
| 5,068,056 A | 11/1991 | Robb | |
| 5,545,468 A | 8/1996 | Koshiba et al. | |
| 5,550,095 A | 8/1996 | Naito et al. | |
| 5,562,763 A | 10/1996 | Bruckner et al. | |
| 5,698,177 A | 12/1997 | Pratsinis et al. | |
| 5,714,260 A | 2/1998 | Okuda et al. | |
| 5,770,310 A | 6/1998 | Noguchi et al. | |
| 5,840,111 A | 11/1998 | Wiederhoft et al. | |
| 6,001,326 A | 12/1999 | Kim et al. | |
| 6,099,634 A | 8/2000 | Uenishi et al. | |
| 6,689,716 B2 * | 2/2004 | Sabacky et al. | ............. 502/439 |
| 6,890,510 B2 | 5/2005 | Spitler et al. | |
| 2002/0071806 A1 | 6/2002 | Sabacky et al. | |
| 2003/0086865 A1 | 5/2003 | Sabacky et al. | |

FOREIGN PATENT DOCUMENTS

| | | |
|---|---|---|
| EP | 0 832 847 | 4/1998 |
| WO | WO 01/00530 | 6/2000 |
| WO | WO 01/00531 | 6/2000 |
| WO | WO 01/12555 | 6/2000 |
| WO | WO 01/60515 | 8/2001 |

OTHER PUBLICATIONS

Abstract, Japanese Patent No. JP 9309726A2: Lithium Titanate Hydrate and Its Production; issue date Dec. 2, 1997.
Abstract, Japanese Pat. No. JP 9309727A2: Lithium Titanate, Its Production and Lithium Battery Using The Same; issue date Dec. 2, 1997.
Abstract, Japanese Pat. No. JP 9309728A2: Lithium Titanate, Its Production and Lithium Battery Using The Same; issue date Dec. 2, 1997.
Abstract, Japanese Pat. No. JP 10251020A2: Metal Substituted Lithium Titanate, its Production and Lithium Battery Using the Same; issue date Sep. 22, 1998.
Abstract, Japanese Pat. No. JP 10310428A2: Lithium Titanate Hydrate and Production of Lithium Titanate; issue date Nov. 24, 1998.
Abstract, Japanese Pat. No. JP 20281433A2: Production of Lithium Titanate Minute Sintered Particle; issue date Oct. 10, 2000.
Abstract, Japanese Pat. No. JP 20302547A2: Production of Lithium Titanate, Lithium Ion Battery and Its Negative Electrode; issue date Oct. 31, 2000.

* cited by examiner

*Primary Examiner*—Edward M Johnson
(74) *Attorney, Agent, or Firm*—Brinks Hofer Gilson & Lione; G. Peter Nickols

(57) ABSTRACT

A process for making microporous structures that can be used as a catalyst support. The microporous structures have high porosity and high thermal stability, combined with good mechanical strength and relatively high surface area. The process is useful for making titanium dioxide for catalyst structures for use for fuel cells, sensors, electrochemical cells and the like.

14 Claims, 3 Drawing Sheets

METHOD FOR PRODUCING STRUCTURES

This application claims priority from U.S. Ser. No. 60/241,041, filed Oct. 17, 2000, and U.S. Ser. No. 09/982,599 filed Oct. 17, 2001, the entire contents of each are incorporated herein by reference.

The present invention relates to a process for making microporous structures for use as a catalyst support. In particular, the present invention relates to a process for making titanium dioxide suitable as a catalyst structure for fuel cells, sensors, electrochemical cells, and the like. The present invention also relates to a catalyst structure formed from the process of the present invention.

BACKGROUND OF THE INVENTION

Different materials and processes are known for the manufacture of catalyst supports. High porosity and good physical strength are general requirements for such products. High temperature stability of the structure is also required if the catalyst operates at elevated temperature.

U.S. Pat. No. 5,036,037 teaches a method to produce metal oxide catalysts by pyrohydrolysis from solutions of chlorides, fluorides, or nitrates. The process makes particles with a mean size of 20-30 microns and with a high specific surface area. The processing temperature is at least 500° C. and generally higher than 700° C., to avoid the presence of the anion (chloride or fluoride) in the oxide product. The product can be used as such or can be further treated to give it the required physical or chemical properties. Although this process is suitable for the intended product, improvements to the process are desired.

Novel processes for the manufacture of titanium dioxide from aqueous solutions have been disclosed in PCT Publications WO 01/00530, WO 01/00531, and WO 01/12555, the relevant portions of which are incorporated herein by reference. In general, these applications describe the processing of an aqueous solution of a titanium salt by evaporation to produce an intermediate. The evaporation is conducted at a temperature higher than the boiling point of the solution, but lower than the temperature where significant crystal growth of an oxide phase occurs. In some embodiments, the evaporation may be conducted at a temperature higher than the boiling point of the solution but lower than the calcination temperature of the intermediate.

In the case of titanium solutions, the temperature generally ranges from 120° to 350° C., and preferably from 200° to 250° C. The process is preferably conducted by spraying, and can be accomplished in a spray dryer. The spray drying process produces thin-filmed spheres or parts of spheres, with a diameter of about 1 to 100 μm, and a shell thickness of about 0.03 to 5 μm.

After calcination and milling of these spheres or parts of spheres, and depending on the conditions of evaporation, the choice of additives, and the conditions of calcination, ultra-fine nano-sized $TiO_2$ or, alternatively, pigment grade $TiO_2$ can be obtained.

There has been no suggestion, however, that such a process can economically and commercially produce catalyst structures made of metal oxides from salt solutions of the metals. The present invention is therefore directed to a process to economically produce catalyst structures or catalyst supports.

Accordingly, the present invention teaches a process to produce catalysts or catalyst structures with high porosity, high specific surface area, high mechanical strength, and excellent thermal stability. In contrast to the method disclosed in U.S. Pat. No. 5,036,037, the method of the present invention uses lower temperature equipment for the first step of the process and adjunction of chemical control additives. The method uses a combination of spraying, pressing, and crystallization, which allows optimal control of the physical characteristics of the product.

SUMMARY OF THE INVENTION

The present invention provides a process for making catalysts or catalyst structures that comprises mixing an aqueous solution of a metal salt and a chemical control agent to form an intermediate solution. The solution is preferably free of any precipitate.

The intermediate solution is then evaporated to form an intermediate product. The evaporation is conducted under conditions to achieve substantially total evaporation. In particular, the evaporation is conducted at a temperature higher than the boiling point of the feed solution but lower than the temperature where significant crystal growth occurs. The evaporation may be conducted at a temperature higher than the boiling point of the solution but lower than the crystallization temperature of the intermediate. In a particularly preferred embodiment, the intermediate is an amorphous solid formed as a thin film and preferably is spherical or part of a sphere.

The term "substantially total evaporation" or "substantially complete evaporation" refers to evaporation such that the solid intermediate contains less than 15% free water, preferably less than 10% free water, and more preferably less than 1% free water. The term "free water" is understood and means water that is not chemically bound and can be removed by heating at a temperature below 150° C. After substantially total evaporation or substantially complete evaporation, the intermediate product will have no visible moisture present.

The intermediate product is then mixed with a binder to form a mixture that is then dried. The drying can be performed in any suitable manner but is preferably air dried. The dried mixture is then pressed into a desired shape. Suitable desired shapes include, but are not limited to disks, full cylinders or hollow cylinders in the size range of a few mm to about 20 cm.

The shaped product may then be heated to a temperature of about 100° C. to remove any remaining moisture or volatile compounds and prevent cracks during the heat treatment (crystallization) step.

The heat treated product is then crystallized by raising the temperature to a temperature between about 500° C. to about 1300° C. for a period of time from about 2 to about 24 h and then cooled to room temperature. The cooled product is then washed by immersing it in water or dilute acid, heated to boiling and maintained at the boiling point for a period of time from about 5 min to 2 h, to remove traces of any water-soluble phase that may still be present after the crystallization step.

The product formed as a result of the process of the present invention includes a catalyst structure characterized by a porosity in the range of about 30% to about 70% and a thermal stability such that less than 5% dimensional change occurs upon holding the structure at a temperature of about 1100° C. in an oxidizing atmosphere for 8 hours. A preferred product is a titanium dioxide catalyst structure consisting of needle-shaped particles that are strongly bound together while exhibiting a high porosity.

DESCRIPTION OF THE INVENTION

Figure 1:
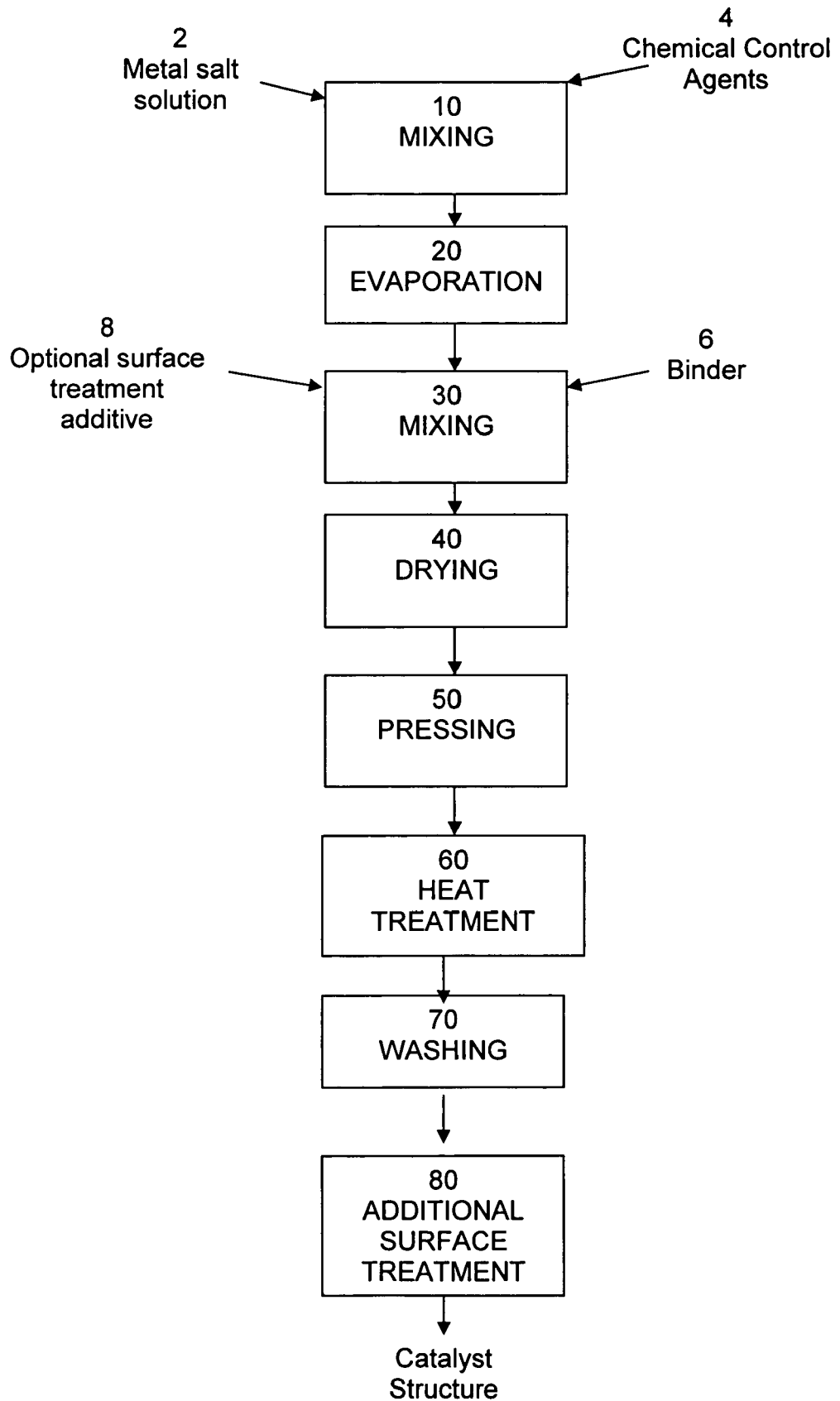
FIG. 1 is a general flow sheet of the process according to the present invention.

Referring now to FIG. 1, a generalized flow sheet of the process of the present invention is shown. With regard to FIG. 1, it has been found that some of the same processing steps and some of the equipment described in U.S. patent application Ser. Nos. 09/500,207, 09/503,365 and 09/503,636, the entire contents of which are incorporated by reference, can advantageously be used to economically produce catalyst structures made of metal oxides, from salt solutions of these metals. In this regard, it is noted that these patent applications correspond to PCT publications WO 01/00531, WO 01/12555, and WO 01/00530, respectively. The contents of these publications are described above.

In accordance with one embodiment of the process of the present invention, a metal salt solution 2 is mixed with one or more chemical control agents 4 in mixer 10. The metal salt solutions are generally sulfates, chlorides, oxychlorides, nitrates, or mixtures thereof. In this regard, the metal forming the salt can be selected from the group consisting of Ti, Zr, Hf, V, Nb, Ta, Cr, Mo, W, Mn, Al, Sn, Sb, Pb, Bi, and mixtures thereof. The metal salt solution may include the soluble salts of Y, Ca, Mg, and mixtures thereof. For example, when the metal forming the salt is Ti or Zr, the metal salt solution may desirably include the soluble salts of Y, Ca, Mg, and mixtures thereof. The solution is preferably free of any precipitate or suspension.

The process is particularly suited to aqueous solutions of titanium and zirconium, more particularly solutions of titanium oxychloride and zirconium oxychloride. The chemical control agents can be, but are not limited to chloride salts of sodium, potassium, lithium, aluminum, tin and zinc. Carbonate, fluoride, sulfate, silicate, borate and other suitable salts of the aforementioned elements may also be used. Additionally, phosphoric acid and phosphate salts of the aforementioned elements may be used. Accordingly, the chemical control agent is selected from the group consisting of chloride salts, carbonate salts, fluoride salts, sulfate salts, silicate salts, borate salts and phosphate salts of sodium, potassium, lithium, aluminum, tin, and zinc and phosphoric acid. In a preferred process, titanium oxychloride solution is used as feed and sodium phosphate is used as a chemical control agent.

The mixed solutions are subjected to substantially total evaporation 20 by contact with a hot surface or by spraying in a stream of hot gas to form an intermediate product. The substantially total evaporation is conducted above the boiling point of the solution and below the temperature where there is significant crystal growth. The intermediate product is an amorphous hydrous oxide. The term "substantially total evaporation" means that the resulting intermediate product contains less than 15% free water, preferably less than 10% free water, and more preferably less than 1% free water. The term "free water" is understood and means water that is not chemically bound and can be removed by heating at a temperature below 150° C. After substantially total evaporation, the intermediate product will have no visible moisture present. Water and volatile products of the acid involved are vaporized and may be recovered by any known process.

Preferably, evaporation by the spraying process is accomplished in a spray dryer. The use of a spray dryer allows the resulting physical and chemical characteristics of the solid product to be controlled within a fairly narrow range through control of the operating parameters, including temperature, flow rate, concentration of the metal, and the type and amount of chemical control agents. In general, the temperature in the spraying chamber is in the range of about 100° C. to about 400° C. and the concentration in the feed solution is in the range of about 10 to about 200 g/l of metal. Preferably, the temperature range is from about 150° C. to about 250° C. and the concentration range of the metal is from about 50 to about 150 g/l.

The intermediate product resulting from spraying in a spray dryer will be composed of thin-filmed spheres or parts of spheres. The dimensions of the spheres may vary over a wide range, from about 1 μm to 100 μm in diameter, and the shell thickness in the range from about 30 nm to about 5000 nm, preferably from about 30 nm to about 1000 nm. This intermediate product may be called amorphous.

This intermediate product of the spraying process is further mixed with a binder 6 in the second mixing step 30 and optionally with surface treatment additives 8. The binder may include material effective to provide surface treatment of the intermediate product such as surface deposition and surface modification. It may involve complex microstructure control that may be used to enhance desired properties (i.e. thermal catalytic properties, conductivity of the surface layer or morphology of the microstructure). The binders have a lubricating action during the pressing process and are necessary to provide a well-finished surface. Binders must have good burnout properties during the heat treatment process.

The binder may be an organic or an inorganic binder. Inorganic binders may include but are not limited to metal salt solutions, salts, colloidal metals and complex mixtures thereof. Organic binders may be natural or synthetic. Natural organic binders may include but are not limited to starch and its derivatives, cellulose ethers such as caboxymethyl cellulose, hydroxyethyl cellulose, methyl hydroxypropyl cellulose and soybean protein. Synthetic organic binders may include but are not limited to polymers or copolymers of styrene, butadiene, acryl ester, vinyl acetate, and acrylonitrile. Polyvinyl alcohol, ammonium polyacrylate and sodium polyacrylate are examples of suitable organic binders.

The optional surface treatment additives are generally similar to the chemical control agents. Accordingly, the optional surface treatment additives include, but are not limited to, chloride salts of sodium, potassium, lithium, aluminum, tin and zinc. Carbonate, fluoride, sulfate, silicate, borate and other suitable salts of the aforementioned elements may also be used. Additionally, phosphoric acid and phosphate salts of the aforementioned elements may be used. Accordingly, the chemical control agent is selected from the group consisting of chloride salts, carbonate salts, fluoride salts, sulfate salts, silicate salts, borate salts and phosphate salts of sodium, potassium, lithium, aluminum, tin, and zinc and phosphoric acid.

Thereafter, the product is dried in a drying step 40. Drying may be performed in any suitable manner. The material to be dried may be placed on shelves in a drying oven, or it may be passed in continuous motion through a belt oven or a pusher oven. Drying may also be accomplished in a rotary kiln. Heating may be provided for example by an electric heating resistance, by a flow of hot air or by a flow of hot combustion gases.

The dried material is pressed into the desired shape in a pressing step 50. The pressure applied may vary over a wide range, but is preferably in the range from 2000 to 20,000 psi. A hydrostatic press may be used to press disks or cylinders. Special attachments may be used to make pressed material of different shapes.

The shaped product may then be heated to a temperature of about 100° C. to remove any remaining moisture or volatile compounds and prevent cracks during the heat treatment (crystallization) step. The pressed product is then subjected to a heat treatment step 60 where the pressed product is further dried and slowly heated. In a preferred embodiment, the heat treatment is conducted over a period of at least about 2 h to a temperature where crystallization and crystal growth occurs.

This crystallization temperature varies with the nature of the material serving as a catalyst structure, as well as with the nature of the addition. The temperature and conditions of conversion are dependent upon the nature and amount of the additives. The temperature is generally in the range of about 500° C. to about 1300° C. for a period of time from about 2 to about 24 h and then cooled to room temperature. The temperature is generally in the range of about 800° C. to about 1200° C. for $TiO_2$ and in the range from about 1000° C. to 1300° C. for $ZrO_2$. The total time of a heat treatment cycle varies from about 2 hours to about 24 hours.

The equipment used for heat treatment may be any kind of furnace with good temperature control. Small productions may be made in a muffle furnace. For larger productions, a continuous belt furnace with zones at different temperatures is preferred.

After this heat treatment step, the product may be subjected to one or more washing steps 70, which may include washing with dilute acid and/or washing with water to remove soluble traces of the chemical control agent that was introduced before the spray-drying step or to remove the optional surface treatment additive introduced after evaporation but prior to the heat treatment step.

The washing steps may include a step where the heat treatment product and the washing solution are heated to boiling and maintained at the boiling point for a period of time from about 5 min to 2 h, to remove traces of any water-soluble phase that may not have reacted during the heat treatment step.

The macrostructure of the product may be further modified by additional surface treatments or depositions 80. A different metal oxide may be deposited by chemical vapor deposition or from liquid phase solutions of the metal oxide precursor. This coated material may then be thermally treated to mineralize the surface coating. The coating and curing process may be repeated several times until the desired coating thickness is developed.

Without being bound by any theory, it is believed that the spraying process under the conditions of the present process yields spheres composed of a thin film of an amorphous solid that can be converted to a crystal structure with the required properties. Particularly, the crushed and compacted spherical shells create, after crystallization, a structure that is both very porous and mechanically robust.

The process of the present invention produces catalyst or crystalline structures with a porosity in the range from 30% to 70%. In addition, the structures formed from the process of the present invention are characterized by having a thermal stability such that less than 5% dimensional change occurs upon holding the structure at 1100° C. in an oxidizing atmosphere for 8 hours. The specific surface area may vary over a wide range, but is generally in the range of about 1 to about 10 $m^2/g$. The mechanical crushing strength of the catalyst structure produced is at least 1 MPa (10 bar or approximately 145 psi). The size of the individual particles forming the porous structure is generally in the micron range, from about 0.1 micron to 50 micron in length. The particles may have any shape, but are often needles with a width to length ratio from to 1:1 to 1:20.

The size of these structures is not limited by the mentioned techniques. Further, the surface may be modified to include metal or metal oxides or may be coated with other metal oxides and solid solutions. The process of the present invention also allows the creation of multilayered crystalline materials fused into a porous macrostructure that may be easily swept by reactive gases or solutions.

The following examples illustrate, but do not limit, the present invention.

EXAMPLE I

A solution of titanium chloride containing 40 g/l Ti, 140 g/l Cl and 0.2% $Na_3PO_4.12H_2O$ was injected and subjected to substantially total evaporation in a spray dryer. The spray dryer consists of a reaction chamber followed by bag filters and a hydrochloric acid absorption system. The solution was injected at a rate of 3 liters/min through an atomizing disk. Gases from the combustion of natural gas, diluted with air to 580° C. were also injected around the disk. The outlet temperature of the spray dryer was 250° C. and the total gas flow about 800 scfm. Reactor off-gases were sent to a bag filter to collect the $TiO_2$ product.

Ten grams of polyvinyl alcohol of molecular weight between 11,000 and 31,000 was dissolved in 100 ml of water. The mixture was further diluted into 200 ml of ethanol, and combined with 100 g of the titanium dioxide spray dryer product. The resulting paste was dried in a drying oven at 90° C., and then pressed into discs of 3.4 cm diameter under a pressure of 500 bar. The discs were further heat-treated according to the following cycle:

4 h at 110° C.
gradual temperature increase of 5° C./min up to 1150° C.
4 h at 1150° C.
the furnace was turned off and the product allowed to cool
The discs were washed by immersing them in water and brought to boiling for a period of 1 h.

The resulting product showed a monolithic porous structure consisting of rutile crystals grown in place. This structure is clearly distinct from what would be obtained by sintering of a powdered crystalline material. XRD analysis showed only pure rutile as the predominant solid phase and dimensional and density measurements indicated a void space fraction of 0.59.

Figure 2:
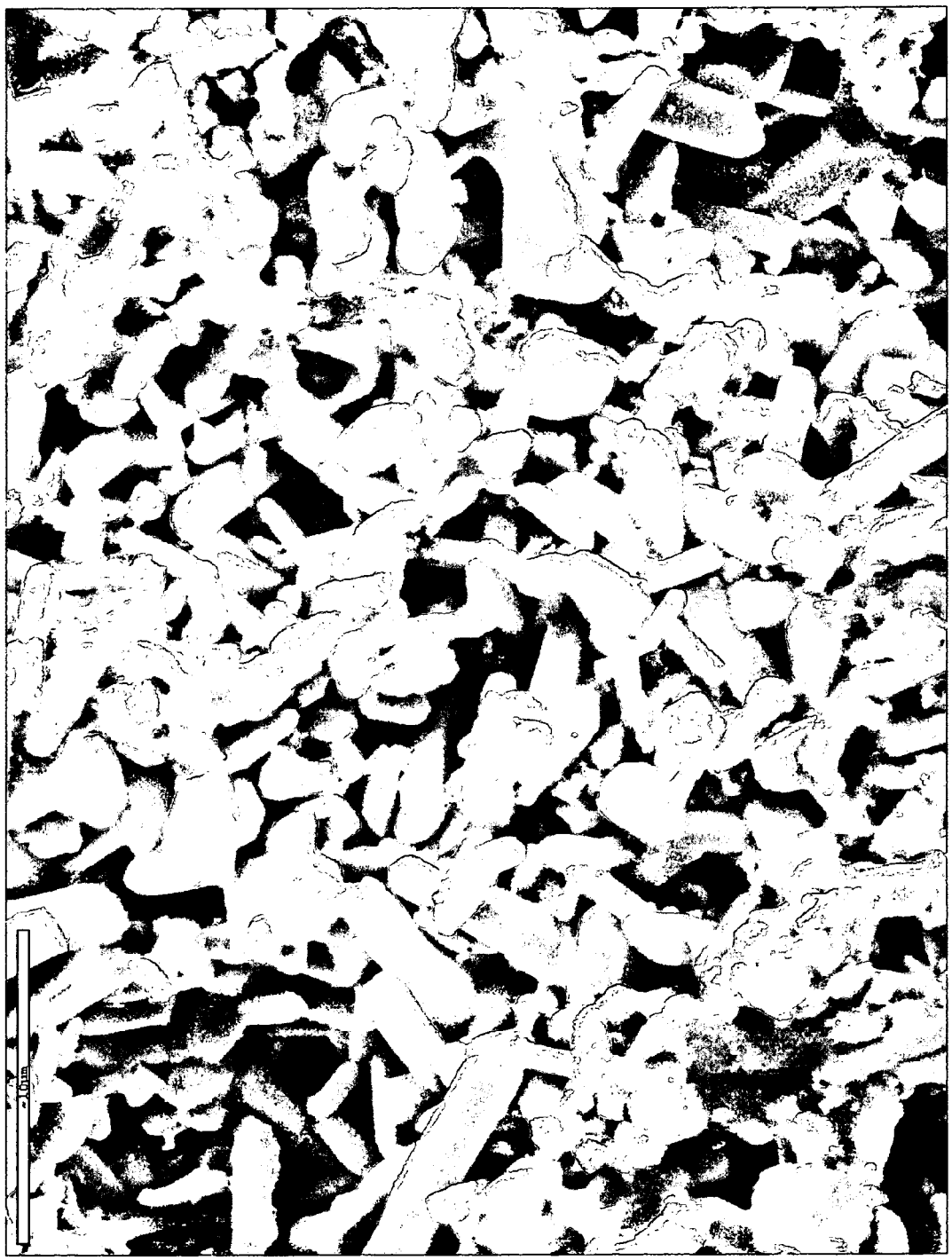
FIG. 2 is a scanning electron micrograph of one example of a catalyst structure obtained according to the process of the present invention.

FIG. 2 is a scanning electron micrograph of the structure, enlarged 3000 times. It shows a structure of elongated rutile crystals with a cross-section of about 1-2 μm and a length of about 5 to 10 μm.

EXAMPLE II

To a solution of titanium chloride containing 40 g/l Ti and 140 g/l Cl were added 0.67 g/l sodium silicate $Na_2SiO_3.9H_2O$. The resultant solution was injected and subjected to substantially total evaporation in a spray dryer in the same conditions as those given in Example I. The titanium oxide product was recovered in a baghouse.

Further treatment was identical to the treatment corresponding to Example I, except that the crystallization temperature was 920° C. instead of 1150° C.

Figure 3:
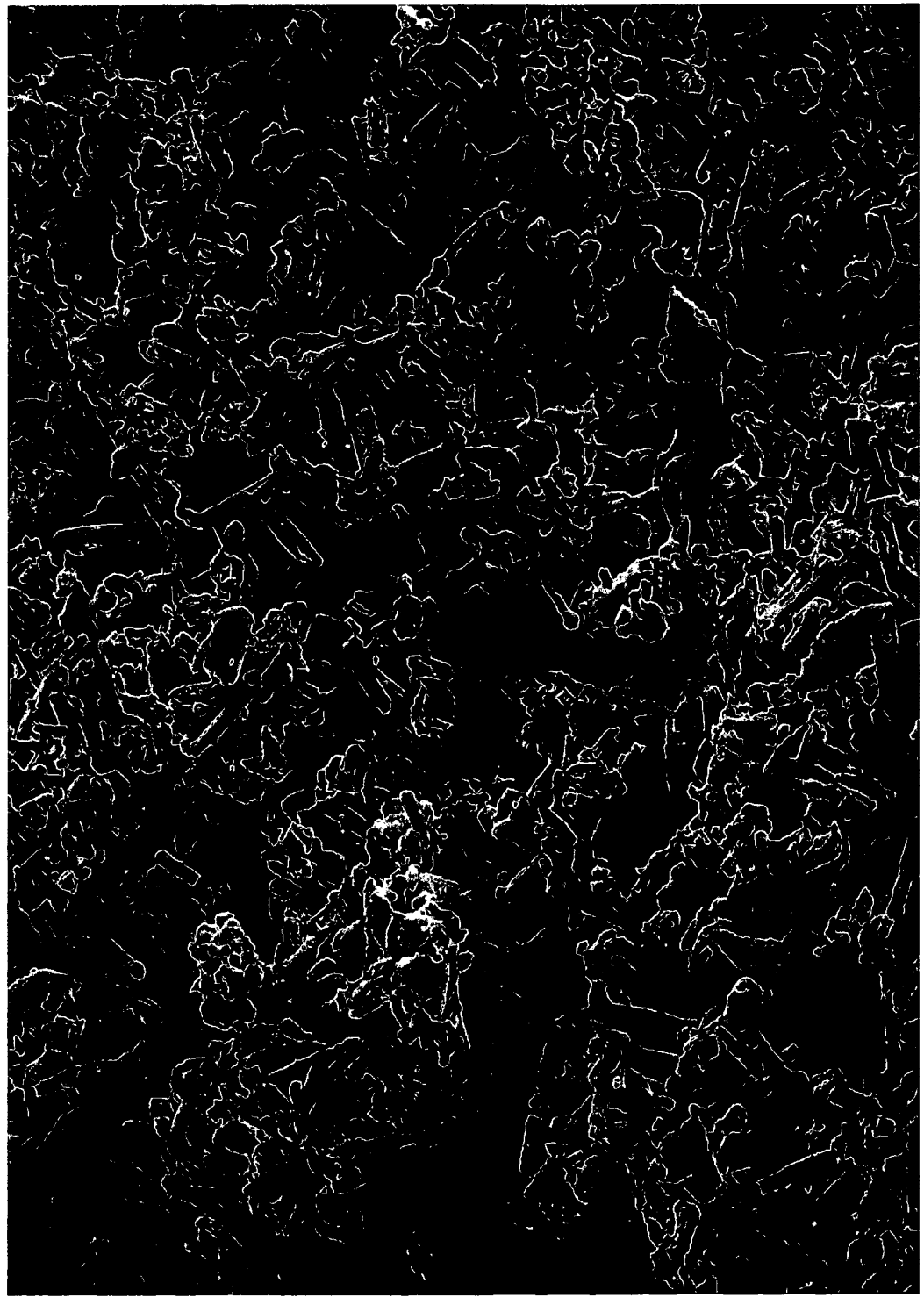
FIG. 3 is a scanning electron micrograph of another example of a catalyst structure obtained according to the process of the present invention.

The resulting product showed a monolithic porous structure consisting of rutile crystals grown in place. XRD analysis showed only pure rutile as the solid phase. FIG. 3 is a scanning electron micrograph of the structure, enlarged 3000 times. It shows elongated rutile crystals with a length of about 2 to 10 µm and a width to length ratio up to 1:10. The addition of sodium silicate generally produced more elongated crystals than the addition of sodium phosphate.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed:

1. A process for the manufacture of structures comprising:
   a. mixing an aqueous solution of a metal salt and a chemical control agent to form an intermediate solution;
   b. evaporating the intermediate solution to form an intermediate product wherein the evaporating is conducted in a controlled temperature process at a temperature higher than the boiling point of the solution but lower than the temperature where significant crystal growth occurs;
   c. mixing the intermediate product with a binder to form a mixture;
   d. drying the mixture to form a dried mixture;
   e. pressing the dried mixture into a desired shape;
   f. crystallizing by raising the temperature to a range between about 500° C. to about 1300° C. for a period of time from about 2 to about 24 h and thereafter by cooling to room temperature; and,
   g. washing the product of step f.

2. The process of claim 1 wherein the metal forming the metal salt can be selected from the group consisting of Ti, Zr, Hf, V, Nb, Ta, Cr, Mo, W, Mn, Al, Sn, Sb, Pb, Bi, and mixtures thereof.

3. The process of claim 1 wherein the metal salt is selected from the group consisting of titanium oxychloride or zirconium oxychloride.

4. The process of claim 1 wherein the metal salt is titanium oxychloride and wherein during the crystallizing step the temperature is raised to a range between about 800° C. to about 1200° C.

5. The process of claim 1 wherein the metal salt is zirconium oxychloride and wherein during the crystallizing step the temperature is raised to a range between about 1000° C. to about 1300° C.

6. The process of claim 1 wherein the chemical control agent is selected from the group consisting of chloride salts, carbonate salts, fluoride salts, sulfate salts, silicate salts, borate salts and phosphate salts of sodium, potassium, lithium, aluminum, tin, and zinc and phosphoric acid.

7. The process of claim 1 wherein the evaporation step is conducted at a temperature between about 100° C. and about 400° C.

8. The process of claim 1 wherein the evaporating is conducted by spraying.

9. The process of claim 8 wherein the intermediate product comprises a plurality of hollow spheres and parts of spheres.

10. The process of claim 9 wherein the diameter of the spheres is between about 1 µm and about 100 µm.

11. The process of claim 9 wherein the thickness of the sphere is between about 30 nm and about 5000 nm.

12. The process of claim 1 wherein the binder is selected from the group consisting of inorganic binders, organic binders, and mixtures thereof.

13. The process of claim 1 wherein the washing is conducted by successively immersing the product in water, heating it to boiling, and keeping it at the boiling point for a period of time from about 5 min to 2 h.

14. The process of claim 1 wherein a surface treatment additive is mixed with the intermediate product and binder.

* * * * *